US010740368B2

(12) United States Patent
Dentel et al.

(10) Patent No.: US 10,740,368 B2
(45) Date of Patent: Aug. 11, 2020

(54) QUERY-COMPOSITION PLATFORMS ON ONLINE SOCIAL NETWORKS

(71) Applicant: Facebook, Inc., Menlo Park, CA (US)

(72) Inventors: Christopher William Dentel, Seattle, WA (US); Lowell Bander, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 803 days.

(21) Appl. No.: 14/982,272

(22) Filed: Dec. 29, 2015

(65) Prior Publication Data

US 2017/0185603 A1 Jun. 29, 2017

(51) Int. Cl.
*G06F 16/332* (2019.01)
*G06F 16/338* (2019.01)
*G06F 16/901* (2019.01)

(52) U.S. Cl.
CPC ........ *G06F 16/3322* (2019.01); *G06F 16/338* (2019.01); *G06F 16/9024* (2019.01)

(58) Field of Classification Search
CPC .................................................. G06F 16/3322
See application file for complete search history.

(56) References Cited

U.S. PATENT DOCUMENTS

| 5,555,403 | A | * | 9/1996 | Cambot ............ G06F 17/30398 |
| 5,918,014 | A | | 6/1999 | Robinson |
| 6,539,232 | B2 | | 3/2003 | Hendrey |
| 6,957,184 | B2 | | 10/2005 | Schmid |
| 7,069,308 | B2 | | 6/2006 | Abrams |
| 7,379,811 | B2 | | 5/2008 | Rasmussen |
| 7,539,697 | B1 | | 5/2009 | Akella |
| 7,752,326 | B2 | | 7/2010 | Smit |
| 7,783,630 | B1 | | 8/2010 | Chevalier |
| 7,836,044 | B2 | | 11/2010 | Kamvar |
| 8,027,990 | B1 | | 9/2011 | Mysen |
| 8,055,673 | B2 | | 11/2011 | Churchill |
| 8,060,639 | B2 | | 11/2011 | Smit |
| 8,082,278 | B2 | | 12/2011 | Agrawal |
| 8,112,529 | B2 | | 2/2012 | Van Den Oord |
| 8,135,721 | B2 | | 3/2012 | Joshi |
| 8,145,636 | B1 | | 3/2012 | Jeh |
| 8,180,804 | B1 | | 5/2012 | Narayanan |
| 8,185,558 | B1 | | 5/2012 | Narayanan |
| 8,239,364 | B2 | | 8/2012 | Wable |
| 8,244,848 | B1 | | 8/2012 | Narayanan |
| 8,271,471 | B1 | | 9/2012 | Kamvar |
| 8,271,546 | B2 | | 9/2012 | Gibbs |
| 8,301,639 | B1 | | 10/2012 | Myllymaki |
| 8,306,922 | B1 | | 11/2012 | Kunal |
| 8,312,056 | B1 | | 11/2012 | Peng |
| 8,321,364 | B1 | | 11/2012 | Gharpure |
| 8,364,709 | B1 | | 1/2013 | Das |
| 8,386,465 | B2 | | 2/2013 | Ansari |

(Continued)

*Primary Examiner* — Kris E Mackes
(74) *Attorney, Agent, or Firm* — Jordan IP Law, LLC

(57) ABSTRACT

In one embodiment, a method includes accessing a first set of objects, identifying one or more configuration files based on attributes of the first set of objects and attribute types specified by the configuration files, receiving from a user an input of a query constraint corresponding to one of the identified configuration files, identifying a second set of objects matching the first query constraint, and sending to the user search results corresponding to the second set of objects.

20 Claims, 12 Drawing Sheets

(56) References Cited

U.S. PATENT DOCUMENTS

| | | |
|---|---|---|
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2007/0174304 A1 | 7/2007 | Shrufi |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0191760 A1* | 7/2010 | Kusumura ............ G06F 16/258 707/760 |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2011/0320472 A1* | 12/2011 | Griffith ................ G06F 16/338 707/767 |
| 2012/0047147 A1 | 2/2012 | Redstone |
| 2012/0059708 A1 | 3/2012 | Galas |
| 2012/0109988 A1* | 5/2012 | Li ..................... G06F 17/30165 707/756 |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198158 A1* | 8/2013 | Tijssen .............. G06F 17/30882 707/706 |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254305 A1 | 9/2013 | Cheng |
| 2014/0006416 A1 | 1/2014 | Leslie |
| 2014/0019868 A1* | 1/2014 | Varian ............... G06F 17/30864 715/738 |
| 2014/0067535 A1 | 3/2014 | Rezaei |
| 2014/0122465 A1 | 5/2014 | Bilinski |
| 2014/0156684 A1* | 6/2014 | Zaslavsky ......... G06F 17/30389 707/756 |
| 2016/0078101 A1* | 3/2016 | Somaiya .............. G06F 17/3064 707/706 |
| 2016/0140197 A1* | 5/2016 | Gast ................. G06F 17/30575 707/626 |

* cited by examiner

QUERY-COMPOSITION PLATFORMS ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a user of a database system, such as one associated with the social-networking system, may conduct a search of the database system through the input of a query command, which may be directly executable by a search engine to conduct a search against data objects in one or more data stores. A query-composition platform, along with one or more associated user interfaces, may facilitate composition of query commands by the user by retrieving, displaying, and executing, in a step-by-step manner, configuration files that correspond to component constraints of the query command. The query-composition platform may provide a powerful tool for users with limited knowledge about the database system in efficiently searching the database system by formulating valid query commands.

In particular embodiments, the query-composition platform may have access to objects in one or more data stores of a database system. The query-composition platform may further have access to a plurality of configuration files, each configuration file being executable to retrieve one or more objects from the data stores. In particular embodiments, although the user may have a complex query command in mind, the user is not required to create the entire query command at once. A user interface based on the query-composition platform may first prompt the user to input a first set of objects as a starting point. For example, in a human resources management context, if the user intends to search the database system for all supervisors of Company X's employees, who work on a task named Task A, the user is not required to enter the entire corresponding query command initially. The user, instead, may be prompted to input all employees of Company X as the first set of objects. In particular embodiments, the query-composition platform may then identify one or more configuration files that, when executed, may conduct a valid search on the first set of objects and return at least one result. The query-composition platform may then provide for display to the user a list of candidate query constraints, each corresponding to an identified configuration file, to select from to be the initial component of the query command. For example, the user may choose the constraint "getDoer" from the list as the initial component of the query command. This chosen constraint may correspond to a configuration file accessible to the query-composition platform, which, when executed, identifies employees working on a particular task.

In particular embodiments, the query-composition platform may identify a second set of objects that would be retrieved by the selected query constraint. The query-composition platform may use either the identified second set of objects or a new set of objects inputted by the user as a new starting point to identify candidate query constraints to be the next component of the query command. Here, each candidate query constraint preserves the validity of the existing partial query command when added to the partial query command. In particular embodiments, this process may be repeated until the user has selected all components of the intended query command. The query-composition platform may then combine all the chosen components into a completed query command and search the database system using the completed query command. In this way, the query-composition platform ensures that every component of a query command composed by the user is valid with respect to objects in the database system and with respect to other components of the query command. This guarantees that the completed query command is valid and will return a non-empty set of objects as search results. The query-composition platform, operable as an added layer of abstraction on top of the database system, may reduce the difficulty in efficiently searching the database system using query commands, particularly in at least two situations: when there is no comprehensive representation or index of the relationships among data objects (e.g., a social graph), such that the path of retrieving particular objects is often unclear and when the user's knowledge about the database system is limited.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
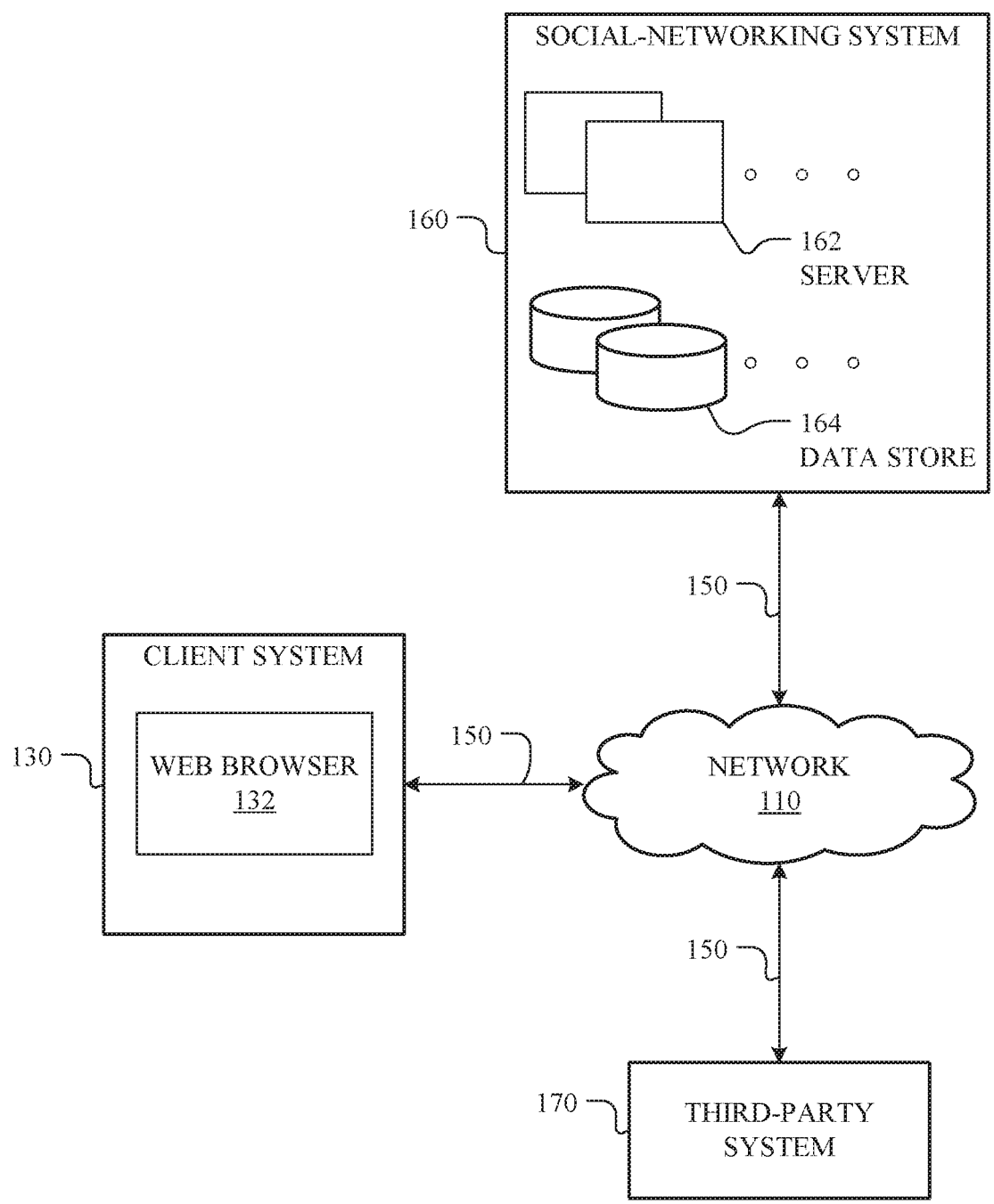
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
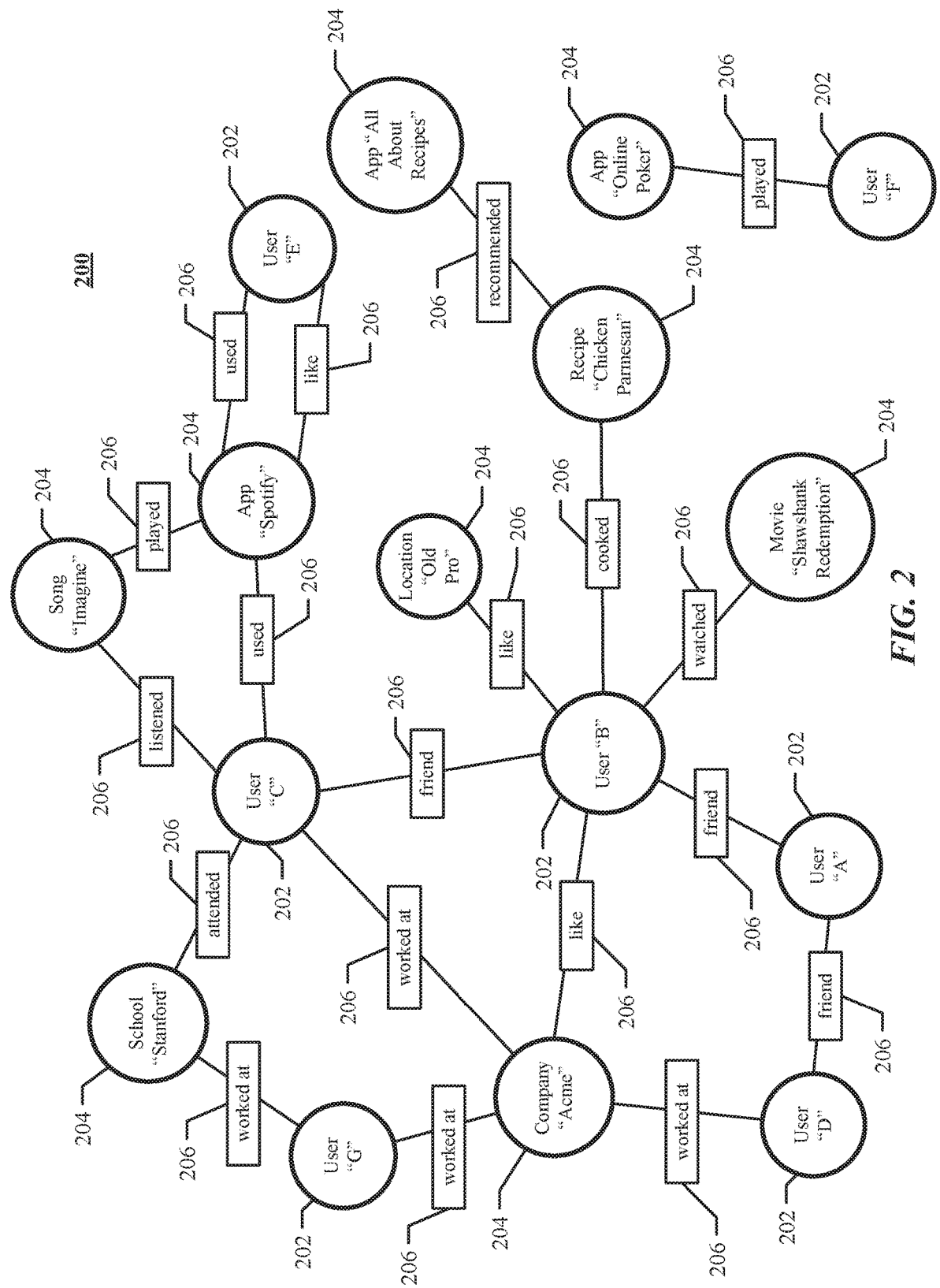
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in the social graph 200 may represent or be represented by a webpage (which may be referred to as a "profile page"). Profile pages may be hosted by or accessible to the social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPO-TIFY").

In particular embodiments, the social-networking system 160 may create an edge 206 between a user node 202 and a concept node 204 in the social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile page. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, a user interface/view state of a native application associated with the online social network, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile pages and respective user nodes 202 or concept nodes 204, such as a profile page named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/556,060, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/556,060, filed 23 Jul. 2012, U.S. patent application Ser. No. 13/674,695, filed 12 Nov. 2012, U.S. patent application Ser. No. 13/731,866, filed 31 Dec. 2012, and U.S. patent application Ser. No. 13/877,049, filed 3 May 2013, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Indexing Based on Object-Type

Figure 3:
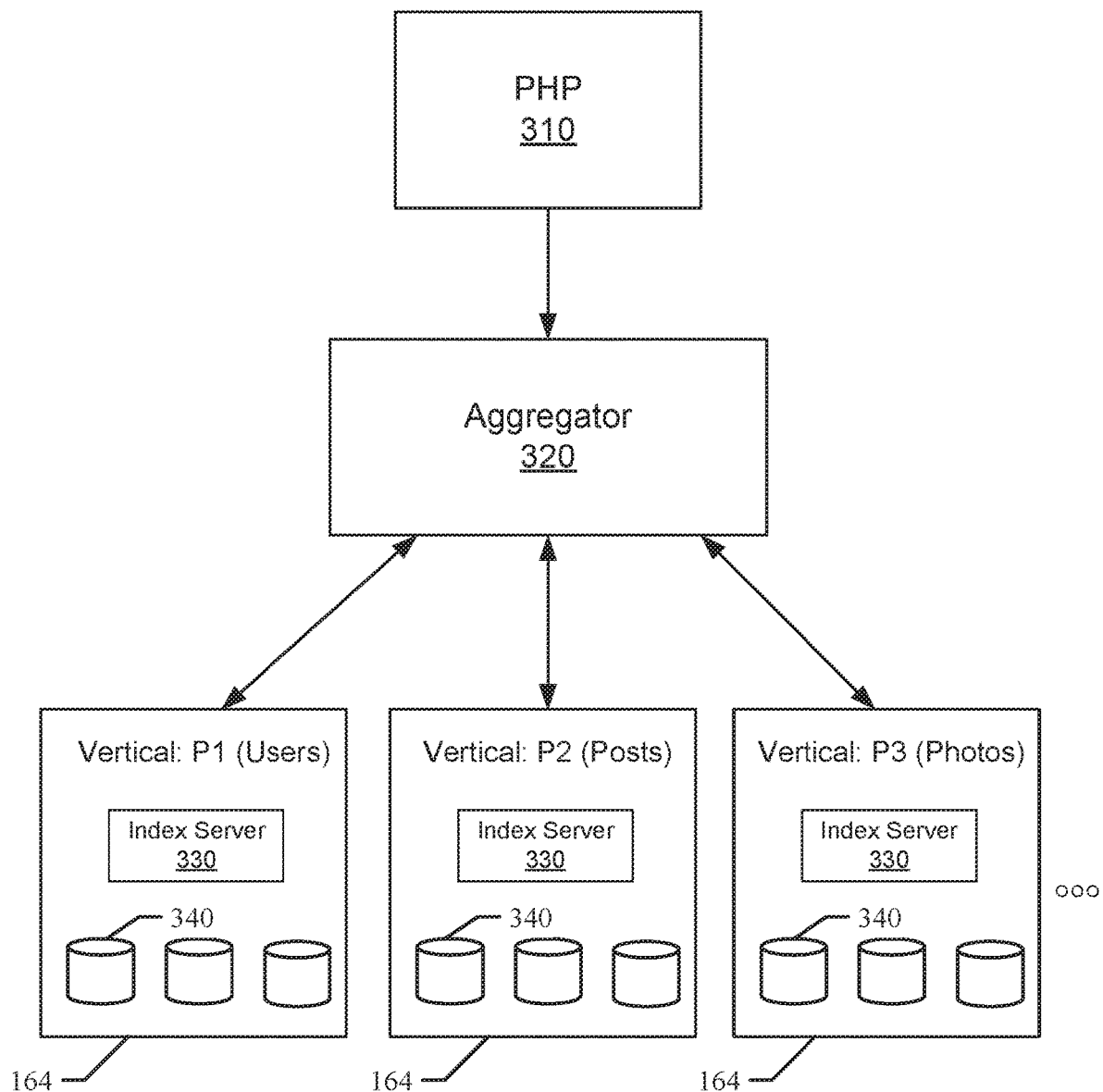
FIG. 3 illustrates an example partitioning for storing objects of the social-networking system.

FIG. 3 illustrates an example partitioning for storing objects of social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned by based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a webpage, an application, a location, a user-profile page, a concept-profile page, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 310. The PHP process 310 may comprise one or more computing processes hosted by one or more servers 162 of social-networking system 160. The search query may be a text string or a search query submitted to the PHP process by a user or another process of social-networking system 160 (or third-party system 170). In particular embodiments, an aggregator 320 may be configured to receive the search query from PHP process 310 and distribute the search query to each vertical. The aggregator may comprise one or more computing processes (or programs) hosted by one or more computing devices (e.g. servers) of the social-networking system 160. Particular embodiments may maintain the plurality of verticals 164 as illustrated in FIG. 3. Each of the verticals 164 may be configured to store a single type of object indexed by a search index as described earlier. In particular embodiments, the aggregator 320 may receive a search request. For example, the aggregator 320 may receive a search request from a PHP (Hypertext Preprocessor) process 210 illustrated in FIG. 2. In particular embodiments, the search request may comprise a text string. The search request may be a structured or substantially unstructured text string submitted by a user via a PHP process. The search request may also be structured or a substantially unstructured text string received from another process of the social-networking system 160. In particular embodiments, the aggregator 320 may determine one or more search queries based on the received search request (step 303). In particular embodiments, each of the search queries may have a single object type for its expected results (i.e., a single result-type). In particular embodiments, the aggregator 320 may, for each of the search queries, access and retrieve search query results from at least one of the verticals 164, wherein the at least one vertical 164 is configured to store objects of the object type of the search query (i.e., the result-type of the search query). In particular embodiments, the aggregator 320 may aggregate search query results of the respective search queries. For example, the aggregator 320 may submit a search query to a particular vertical and access index server 330 of the vertical, causing index server 330 to return results for the search query.

More information on indexes and search queries may be found in U.S. patent application Ser. No. 13/560,212, filed 27 Jul. 2012, U.S. patent application Ser. No. 13/560,901, filed 27 Jul. 2012, U.S. patent application Ser. No. 13/723,861, filed 21 Dec. 2012, and U.S. patent application Ser. No. 13/870,113, filed 25 Apr. 2013, each of which is incorporated by reference.

Query-Composition Platform

In particular embodiments, the social-networking system 160 may incorporate a query-composition platform module or be associated with an external query-composition platform. A query-composition platform, along with one or more associated user interfaces, may facilitate composition of query commands by users of a database system by retrieving, displaying, and executing, in a step-by-step manner, configuration files that correspond to component constraints of query commands. In each step of a multi-step process, the query-composition platform may analyze information associated with data objects of one or more data stores 164, which may be indexed in a database on an index server 330, information associated with a plurality of configuration files, and previous user inputs to provide the user one or more candidate query constraints to select from. Each of the candidate query constraints may preserve the validity of an existing partial query command when added to the partial query command. The user, even without knowledge about the database system, may compose, through a series of selections, a query command that is guaranteed to be valid by the query-composition platform. As used in the description of this invention, a query command is a search query in a form such that it may be directly executable by a search engine to conduct a search against data objects in one or more data stores 164 (e.g., the query command that queries one or more data stores, which are associated with a human resources management application of Company X, for all supervisors of employees that work on a task named task A, may be represented as "getSupervisor(getDoer(taskA))_employees(Company X)"). The query command may comprise one or more query constraints (e.g, getSupervisor, getDoer), each of which may correspond to a configuration file. Configuration files are computer-readable files that, when executed by a search engine, retrieves a set of data objects from one or more data stores 164. Each data object stored in a database system may comprise one or more attributes. The attributes of an object are data entries associated with the object that describe the object in aspects such as its identity, its characteristics, and its relationships with one or more other objects. In particular embodiments, the attributes of an object may each correspond to an edge 206 of the social graph 200 that connects a node 202 associated with the object. Attributes may be categorized into different types based on what each describes. A non-relational attribute of an object is one that contains information inherent to the object; a relational attribute, on the other hand, describes a relationship between the object and one or more other objects. Although this disclosure describes implementing the query-composition platform in a particular manner, this disclosure contemplates implementing the query composition platform in any suitable manner.

In particular embodiments, the query-composition platform may access a first set of objects, each object of the first set of objects comprising one or more attributes, wherein each attribute is of a particular attribute type. The query-composition platform may have access to objects in one or more data stores 164 of a database system, such as one associated with the social-networking system 160. Each data object stored in a database system may comprise one or more attributes. The attributes of an object are data entries associated with the object that describe the object in aspects such as its identity, its characteristics, and its relationships with one or more other objects. In particular embodiments, the attributes of an object may each correspond to an edge 206 of the social graph 200 that connects a node 202 associated with the object. Attributes may be categorized into different types based on what each describes. A non-relational attribute of an object is one that contains information inherent to the object; a relational attribute, on the other hand, describes a relationship between the object and one or more other objects. As an example and not by way of limitation, in a human resources management context, a data store of a database system may contain one or more employee objects corresponding to employees of Company X. A particular employee object may have the following attributes among others: <id> e022333, <entity> employee, <name> Alex, <gender> male, <age> 35, <status> full-time, <supervisor> [Beth], and <team> [marketing]. Here, the content of particular attributes may be placed inside brackets (e.g., [Beth], [marketing]) to indicate that such content are references to other objects. The attribute types associated with the attributes are <id>, <entity>, <name>, <gender>, <age>, <status>, <supervisor>, and <team> respectively. Non-relational attributes <id> e02233, <entity> employee, and <name> Alex, describe the employee object's identity; non-relational attributes <gender> male, <age> 35, and <status> full-time, describe the employee object's characteristics; relational attributes <supervisor> [Beth] and <team> [marketing] describe the employee object's relationships with other objects. As an example and not by way of limitation, in the same human resources management context, another data store of the database system may contain one or more task objects corresponding to tasks performed by employees of Company X. A particular task object may have the following attributes among others: <id> t026, <title> A, <level> 3, <doer> [Alex], <doer> [Beth]. The attribute types associated with the attributes are <id>, <title>, <level>, <doer>, and <doer> respectively. Non-relational attributes <id> t026 and <title> A describe the task object's identity; non-relational attribute <level> 3 describes the task object's characteristic, and relational attributes <doer>[Alex] and <doer> [Beth] describe the object's relationships to other objects. As an example and not by way of limitation, the query-composition platform may access a first set of objects, which comprises employee objects corresponding to all employees of Company X. Each employee object accessed by the query-composition platform may comprise attributes that describe the name, position, seniority, team, responsibilities, etc. about a corresponding employee. As another example and not by way of limitation, in a social-networking context, the query-composition platform may access objects corresponding to posts of a social-networking system 160. Each post object accessed by the query-composition platform may comprise attributes that describe the title of a corresponding post, the content of the post, the identity of the poster, the posting date, numbers of "likes" and comments, etc. In particular embodiments, the query-composition platform may receive, from a client system 130 of a first user, a selection of an object type of a plurality of object types and identify one or more objects of the selected object type, wherein the identified objects comprise the accessed objects of the first set of objects. As an example and not by way of limitation, the query-composition platform may receive, from the client system 130 of the first user, a selection of an object type "employee." This user input may cause the query-composition platform to identify all objects stored in Company X's human resources database system that have the attribute <entity> employee, which indicates the type of the objects, and access all of the identified objects. In particular embodiments, the first set of objects may comprise one or more objects identified based on an input of a query constraint by the first user. As an example and not by way of limitation, the query-composition platform may have received a query constraint getMember(MarketingTeam) from the client system 130 of the first user. The query-composition platform may search one or more data stores 164 of Company X's human resources database system based on the query constraint and identify all employee objects that correspond to members of the company's marketing team. The query-composition platform may then access the identified employee objects. Although this disclosure describes accessing a first set of objects in a particular manner, this disclosure contemplates accessing a first set of objects in any suitable manner.

In particular embodiments, the query-composition platform may identify one or more configuration files corresponding to one or more query constraints, respectively, wherein each configuration file specifies one or more source-object attribute types and one or more destination-object attribute types, wherein, for at least a first object of the first set of objects, each attribute type of the source-object attribute types matches an attribute type of at least one attribute of the first object. The query-composition platform may have access to a plurality of configuration files. The plurality of configuration files may be stored in one or more data stores 164 of the database system or one or more external data stores 164. Configuration files are computer-readable files that, when executed by a search engine, retrieves a set of data objects from one or more data stores 164. Each configuration file corresponds to a specific query constraint. A configuration file may be executed to process an input of a first set of objects, which may alternatively be named source-objects, in order to query one or more data stores 164 and retrieve an output of a second set of objects, which may alternatively be named destination-objects. The execution of particular configuration files may further require an input a third set of objects, which may alternatively be named referenced objects. A configuration file may specify one or more attributes or attribute types that its source-objects must have. As an example and not by way of limitation, in a human resources management context, a configuration file "selectManager," which can be executed by a search engine to receive employee objects and return only those employee objects that correspond to managers of Company X, may specify the source-object attribute <entity> employee and the source-object attribute type <position>. Another configuration file, for example, may specify trivial source-object attributes to limit its input. A configuration file "intersect," which can be executed by a search engine to receive two sets of objects of the same arbitrary type and return the objects that are shared by both sets, may specify the source-object attribute type <id>, which is necessary for the comparison of any two objects. A configuration file may specify one or more attributes or attribute types that its destination-objects always have. As an example and not by way of limitation, the configuration file "selectManager" may specify destination-object attributes of <entity> employee and <position> manager and destination-object attribute type of <supervisee>, assuming each manager at least supervise one other employee. A configuration file may also specify one or more attributes or attribute types that its referenced objects must have. In particular embodiments, the query-composition platform may compare the source-object attributes or source-object attribute types specified by each of a plurality of configuration files with the attributes or attribute types of the accessed first set of objects to determine whether any object has all source-object attributes or attribute types specified by each configuration file. Based on the comparison, the query-composition platform may identify one or more configuration files that may be executed to conduct a search based on an input of at least one of the accessed first set of objects. In particular embodiments, the query-composition platform may compare the destination-object attributes or destination-object attribute types specified by each of a plurality of configuration files with the attributes or attribute types of the accessed first set of objects to determine whether any object has all destination-object attributes or attribute types specified by each configuration file. Based on the comparison, the query-composition platform may identify one or more configuration files that may be executed to conduct a search and retrieve at least one of the accessed first set of objects. As an example and not by way of limitation, after accessing a first set of objects corresponding to all employees of Company X, the query-composition platform may identify the configuration files "selectManager" (specifying source-object attribute <entity> employee and source-object attribute type <position>), "intersect" (specifying source-object type <id>), and "getTeam" (specifying source-object type <team>) among other configuration files. The configuration files are identified because the source-object attributes and/or source-object attribute types specified by each are fully matched by the attributes of at least one employee object. As another example and not by way of limitation, after accessing a first set of objects corresponding to posts of the social-networking system 160, the query-composition platform may identify the configuration files "getPoster" (specifying source-object attribute <entity> post and source-object attribute type <poster>), "getDate" (specifying source-object attribute type <date>), and "union" (specifying source-object attribute types <entity> and <id>) among other configuration files. The configuration files are identified because the source-object attributes and/or source-object attribute types specified by each are fully matched by the attributes of at least one post object. In particular embodiments, the query-composition platform may access one or more data stores 164 storing canonical representations for a plurality of configuration files and object-attribute information comprising one or more source-object attribute types and one or more destination-object attribute types specified by the configuration files in order to identify the one or more configuration files. A canonical representation of a configuration file may comprise one or more data entries that, combined or separately, uniquely identify the configuration file. No canonical representations of two configuration files may be identical. The one or more data stores 164 may store a canonical representation of a configuration file in a way that associates the canonical representation with information about source-object attributes and destination-object attributes specified by the configuration file. As an example and not by way of limitation, the query-composition platform may access a relational database storing canonical representations for a plurality of configuration files in a first column of a table and the attributes and attribute types specified by the configuration files in a plurality of second columns. The query-composition platform may identify rows of the table containing one or more desired attributes or attribute types and access canonical representations in the first column of the identified rows. Based on the accessed canonical representations, the query-composition platform may uniquely identify a plurality of configuration files. Although this disclosure describes identifying one or more configuration files corresponding to one or more query constraints in a particular manner, this disclosure contemplates identifying one or more configuration files corresponding to one or more query constraints in any suitable manner.

In particular embodiments, the query-composition platform may receive, from a client system 130 of a first user, an input of a first query constraint corresponding to a first configuration file of the identified configuration files, wherein the first configuration file specifies one or more destination-object attribute types. In particular embodiments, possibly in response to a communication from the query-composition platform, the first user may input a first query constraint to the query-composition platform through a user interface of the client system 130. The query-composition platform may be implemented on the client system 130 of the first user. Alternatively, the query-composition platform may be implemented on one or more servers that communicate with the client system 130 through a network connection, in which case, the query-composition platform may receive the input of the first query constraint through the network connection. As an example and not by way of limitation, a user interface based on the query-composition platform may display to the first user a dropdown menu containing "selectManager," "intersect", and "getTeam" as candidate query constraints for the first user to choose from. The first user may choose "selectManager" from the dropdown menu by clicking on a corresponding button and thereby send a input to the query-composition platform indicating that the first user intends to add the query constraint "selectManager" as a component of a query command. As another example and not by way of limitation, a user interface based on the query-composition platform may display an input field for the input of query constraints in the form of text strings. In a specific instance of use, the first user may type a string "get" in the input field. The user interface may automatically complete the string to be "getTeam." Alternatively, the first user may type a string "gotTeam" in the input field. The user interface may automatically corrects the string to be "getTeam" using query modification algorithm. More information on query modification may be found in U.S. patent application Ser. No. 13/731,910, filed 31 Dec. 2012, which is incorporated by reference. The first user may then press the "Enter" button on a keyboard to send the input "getTeam" to the query-composition platform indicating that the first user intends to add the query constraint "getTeam" as a component of the query command. As yet another example and not by way of limitation, a user interface based on the query-composition platform may display on the screen of the client system 130 a question, "what do you want next?" and a black space. In a particular instance of use, the first user may type in the blank space "get me their managers" and press "Enter" on a keyboard. The user interface may interpret the first user's input to be the query constraint "getManager" using a natural language interpretation algorithm and send the input to the query composition platform. Alternatively, the user interface may directly send the sentence "get me their managers" to the query-composition platform, which subsequently interprets the input to be the query constraint "getManager." In particular embodiments, the query composition platform may send, to the client system 130 of the first user for display, one or more suggested query constraints, each suggested query constraint being selectable by the first user, wherein each of the suggested query constraints corresponds to one of the identified configuration files. In particular embodiments, the query composition platform may further calculate a size of a set of objects matching each of the suggested query constraints and send, to the client system 130 of the first user for display, an indicator corresponding to the calculated size. As an example and not by way of limitation, a user interface of the client system 130 based on the query-composition platform may display a dropdown menu to the first user containing multiple candidate query constraints while displaying a number next to each of the candidates to indicate the number of objects that would be retrieved if the first user selects a particular candidate. As another example and not by way of limitation, a user interface of the client system 130 based on the query-composition platform may display a dropdown menu to the user containing multiple candidate query constraints while displaying a dot with a color of green, red, or grey next to each of the candidates. A green dot may indicate that more than 1000 objects match the query constraint; a red dot may indicate that between 10 and 999 objects match the query constraint; a grey dot may indicate that between 1 and 9 objects match the query constraint. In particular embodiments, the query composition platform may further rank each of the suggested query constraints based on a search history associated with the first user. As an example and not by way of limitation, the query-composition platform may send five candidate query constraints to the client system 130 for display. One of the five suggested query constraints may be displayed at the top position of the list because the first user has used the query constraint in composing a previous query command. Although this disclosure describes receiving an input of a first query constraint in a particular manner, this disclosure contemplates receiving an input of a first query constraint in any suitable manner.

In particular embodiments, the query-composition platform may identify, by one or more of the computing devices, a second set of objects matching the first query constraint, each object of the second set of objects comprising one or more attributes, wherein each object of the second set of objects has attributes of attribute types matching each destination-object attribute types specified by the first configuration file. The query-composition platform may incorporate a search engine or be associated with an external search engine. The query-composition platform may use a search engine to execute a configuration file to retrieve the second set of objects from one or more data stores 164 in the database system. Alternatively, the query-composition platform may access one or more data stores 164 storing identifiers for a plurality of objects and object-attribute information comprising attributes of the plurality of objects, identify a set of identifiers contained in the data stores 164, and further identify the second set of objects corresponding to the identifiers. Based on how a configuration file can be executed by a search engine to retrieve objects from one or more data stores 164, it can be categorized as a filter, an operator, or an edge. A filter configuration file, when executed by a search engine, may receive a first set of objects as input and apply a predetermined set of criteria on the objects to return a subset of the first set of objects comprising only objects satisfying the criteria. In particular embodiments, when a filter configuration file is executed by the query-composition platform, the query-composition platform may access one or more objects of the first set of objects, determine whether each accessed object comprises a particular attribute specified by the filter configuration file, and select each accessed object determined to comprise the specified attribute to include in the identified second set of objects. An operator configuration file, when executed by a search engine, may receive at least two sets of objects of the same type as input and perform a set operation such as union, intersection, difference, or complement on the at least two sets of objects. In particular embodiments, when an operator configuration file is executed by the query-composition platform, the query-composition platform may perform one or more set operations on the first set of objects and at least one other set of objects and select one or more objects from an outcome of the performed set operations to include in the identified second set of objects. An edge configuration file, when executed by a search engine, may receive a first set of objects as input, apply a function on the first set of objects relying on one or more relational attributes of the objects, and return a set of objects that are of the same or a different type. In particular embodiments, when an edge configuration file is executed by the query-composition platform, the query-composition platform may access one or more objects, determine whether each accessed object has a particular relationship with one or more objects of the first set of objects, wherein the relationship is specified in a relational attribute of an attribute type specified by the edge configuration file, and select each accessed object determined to have the specified relationship to include in the identified second set of objects. The execution of configuration files of the types operator and edge may require references to one or more objects other than the source-objects and the destination objects. In particular embodiments, the input of the first query constraint comprises reference to one or more objects, wherein one or more relationships between each object of the referenced objects and one or more other objects are specified by one or more attributes of the referenced object, the first set of objects, or the second set of objects. In particular embodiments, to facilitate the first user in making such a reference in the input of the first query constraint, the query-composition platform may further send, to the client system 130 of the first user for display, one or more references to suggested objects for the first user to choose from to be part of the input of the first query constraint. As an example and not by way of limitation, the query-composition platform may, in a human resources management context, receive an input of a query constraint "selectManager" from the first user, which corresponds to a filter configuration file. In response to the input and based on a set of source-objects corresponding to all employees of Company X, the query-composition platform may execute the configuration file to identify all source-objects that have the attribute <position> manager and attribute type <supervisee> to return as destination-objects. Here, each of the destination-objects has the attribute <position> manager and attribute type <supervisee>, which match the destination-object attributes and destination-object attribute types specified by the configuration file. As another example and not by way of limitation, the query-composition platform may receive an input of a query constraint "intersect" from the first user, which corresponds to an operator configuration file. The input may also comprise references to a plurality of objects corresponding to people who are friends with the first user on the social-networking system 160. In response to the input and based on a set of source-objects comprising all employees of Company X, the query-composition platform may execute the configuration file to perform a set operation, intersection, between the set of source-objects and the set of referenced objects and identify objects shared by the two sets as the destination-objects. Here, each of the destination-objects has the attribute type <id>, which matches the destination-object attribute type specified by the configuration file. As yet another example and not by way of limitation, the query-composition platform may receive an input of a query constraint "getTask" from the first user, which corresponds to an edge configuration file. The input may comprise references to all tasks assigned to all employees of Company X. In response to the input and based on a set of source-objects comprising three employees Alex, Beth, and Carl, the query-composition platform may execute the configuration file to access all the referenced task objects to identify those comprising an attribute type <doer> and one of the relational attributes <doer> Alex, <doer> Beth, or <doer> Carl to return as the destination-objects. Here, each of the destination-objects has the attribute <entity> task and the attribute type <doer>, which match the destination-object attribute and destination-object attribute type specified by the configuration file. In particular embodiments, the query-composition platform may further store the first query constraint and an index comprising a plurality of entries, each entry corresponding to a respective object of the second set of objects, detect an updated first set of objects, wherein at least one object of the updated first set of objects or one object of the first set of objects is not included in either the updated first set of objects or the first set of objects, identify, upon detecting the updated first set of objects, an updated second set of objects matching the stored first query constraint, and update the stored index based at least in part on the identified updated second set of objects. As an example and not by way of limitation, the query-composition platform may maintain an email list that may be used to send emails to all managers of Company X. This email list may initially be created by applying the query constraint "selectManager" on all employees of Company X. The query-composition platform may store the query constraint "selectManager" and an index whose entries correspond to the identified manager objects included in the email list. The query-composition platform may monitor the set of objects corresponding to all employees of Company X and may detect that two employees left Company X and three employees joined Company X after the creation of the email list. The query-composition platform may then execute the configuration file "selectManager" on the updated set of employee objects and update the stored index and the email list accordingly. Although this disclosure describes identifying a second set of objects matching the first query constraint in a particular manner, this disclosure contemplates identifying a second set of objects matching the first query constraint in any suitable manner.

In particular embodiments, the query-composition platform may send, to the client system 130 of the first user for display, one or more search results corresponding to one or more objects in the second set of objects, respectively. The search results may be displayed in the form of a list of objects (with or without information of attributes of the objects), a list of references (e.g. links) to objects, an index with entries correspond to the objects, a representation of the collection of objects that can be used by the query-composition platform in a further search, etc. In particular embodiments, the search results may be displayed as part of the user interface of the social-networking system 160. As an example and not by way of limitation, the query-composition platform may send, to the client system 130 of the first user for display, a list of names of Company X's employees who are managers. As another example and not by way of limitation, the query-composition platform may send, to the client system 130 of the first user for display, a link that may be copied to an email application's address field to send emails to all managers of the company X. In particular embodiments, the query-composition platform may send, to the client system 130 of the first user for display, a query-composition interface, wherein the query-composition interface comprises one or more query-constraint elements, each query-constraint element being operable to apply a respective query constraint, wherein the query-constraint elements are represented as a hierarchical tree diagram within the query-composition interface. As an example and not by way of limitation, for each query constraint entered by the first user, the query-composition platform may cause the identified objects or search results to be displayed as nodes of the hierarchical tree diagram. In particular embodiments, the query-composition platform may further generate a query command by combining the first query constraint with one or more previously-entered query constraints, identify a third set of objects matching the generated query command; and sending, to the client system of the first user for display, one or more search results corresponding to one or more objects in the third set of objects, respectively. As an example and not by way of limitation, the query-composition platform may combine a first query constraint "getSupervisor" with a previously-entered query constraint "getDoer(taskA)_employees(CompanyX)" to generate a query command "getSupvervisor(getDoer(taskA))_employees (CompanyX)," execute the query command to conduct a search against objects in one or more data stores 164, and send the search results to the client system of the first user for display. In particular embodiments, the search results may be displayed as part of the query-composition interface. Although this disclosure describes sending one or more search results in a particular manner, this disclosure contemplates sending one or more search results in any suitable manner.

Figure 4A:
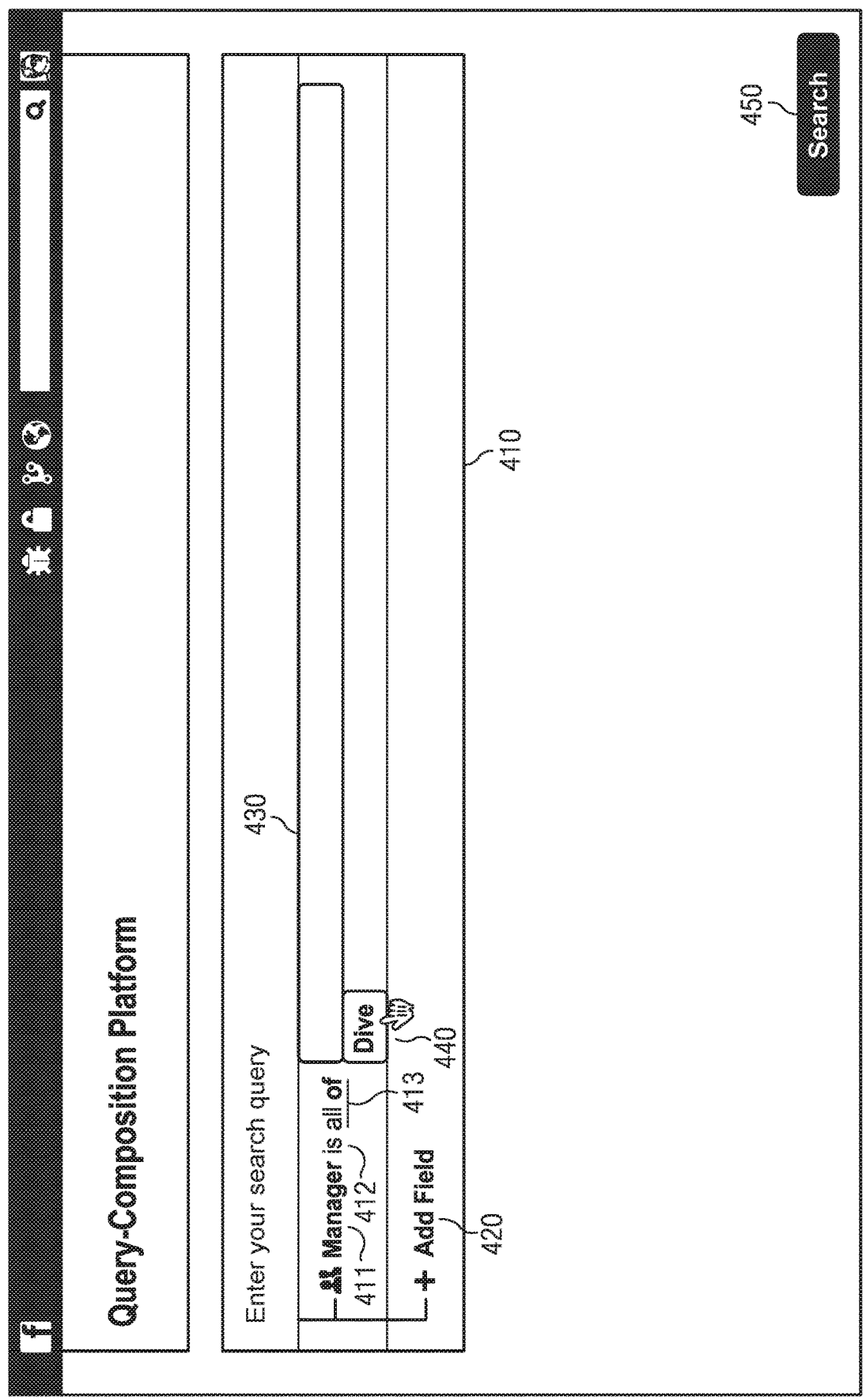
FIGS. 4A-4E illustrate composition of a query command through a user interface based on the query-composition platform.
Figure 4B:
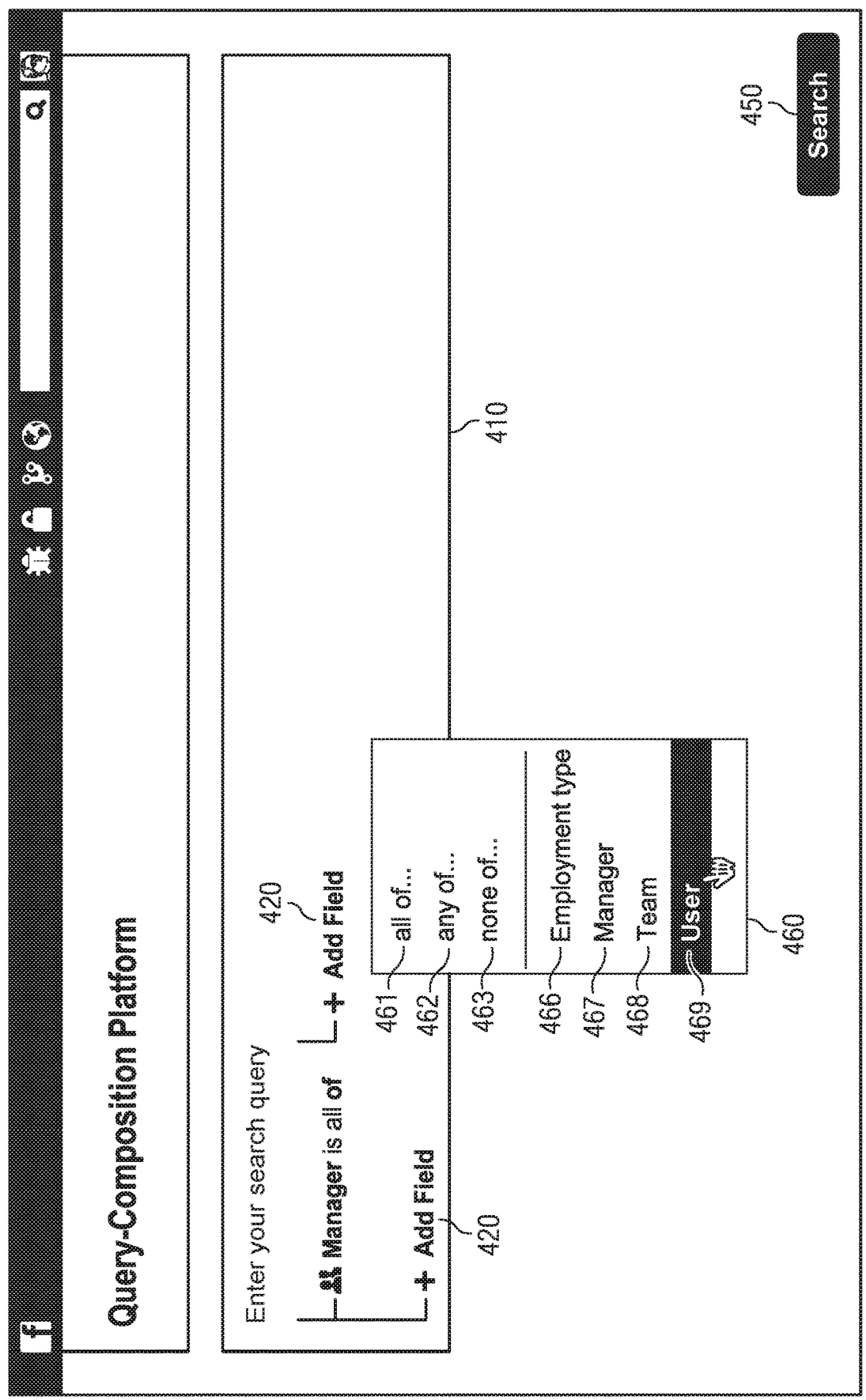
Figure 4C:
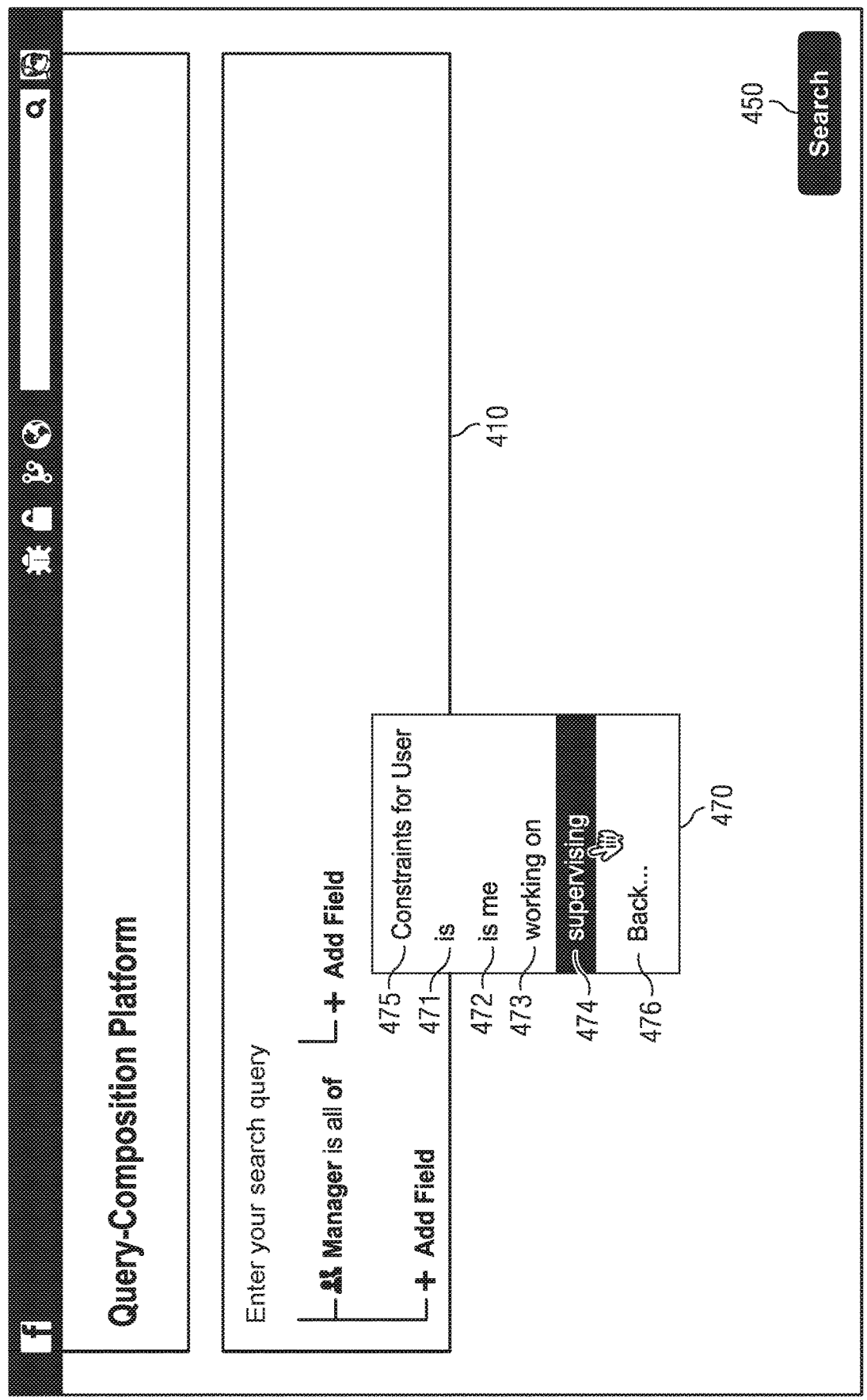
Figure 4D:
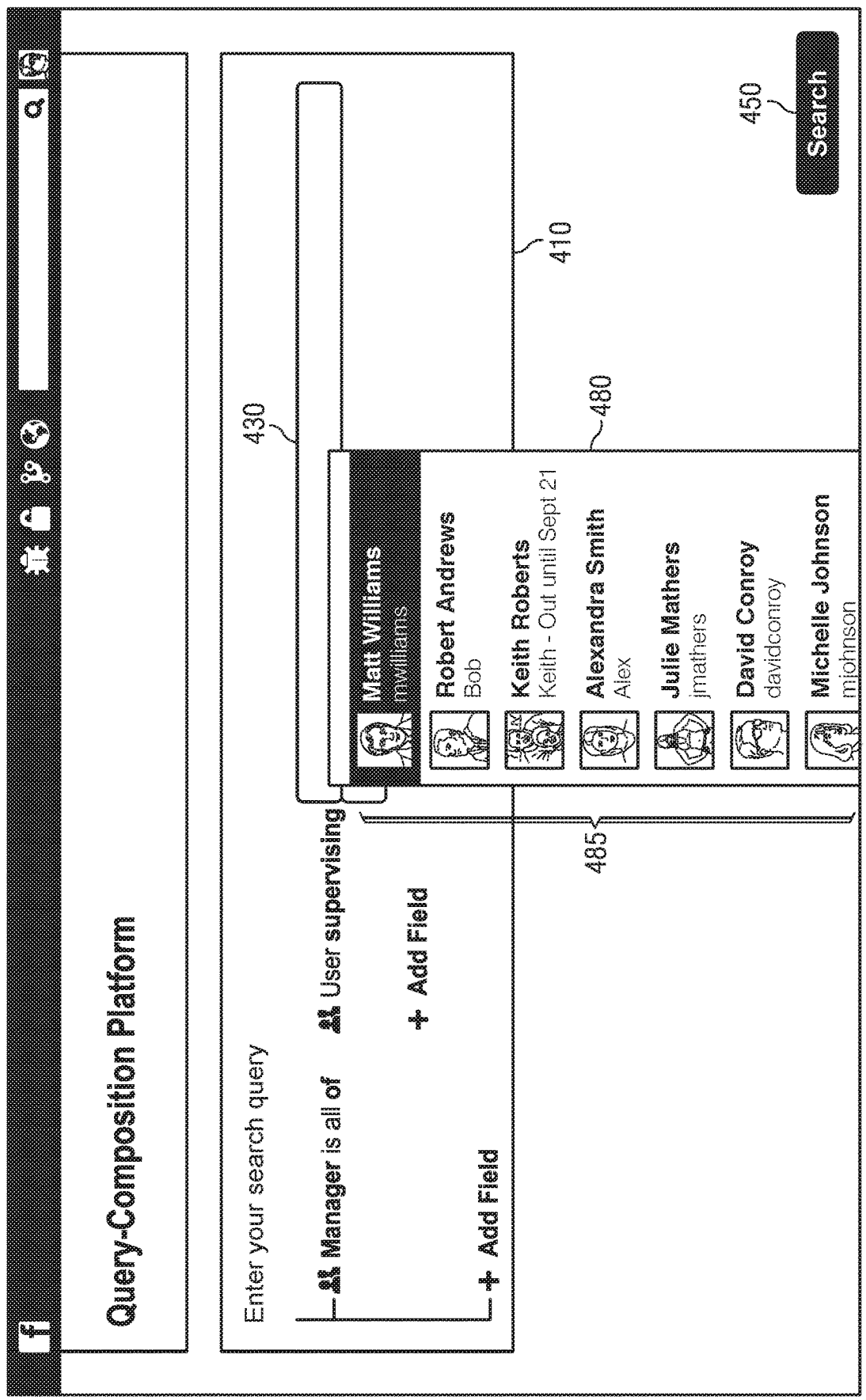
Figure 4E:
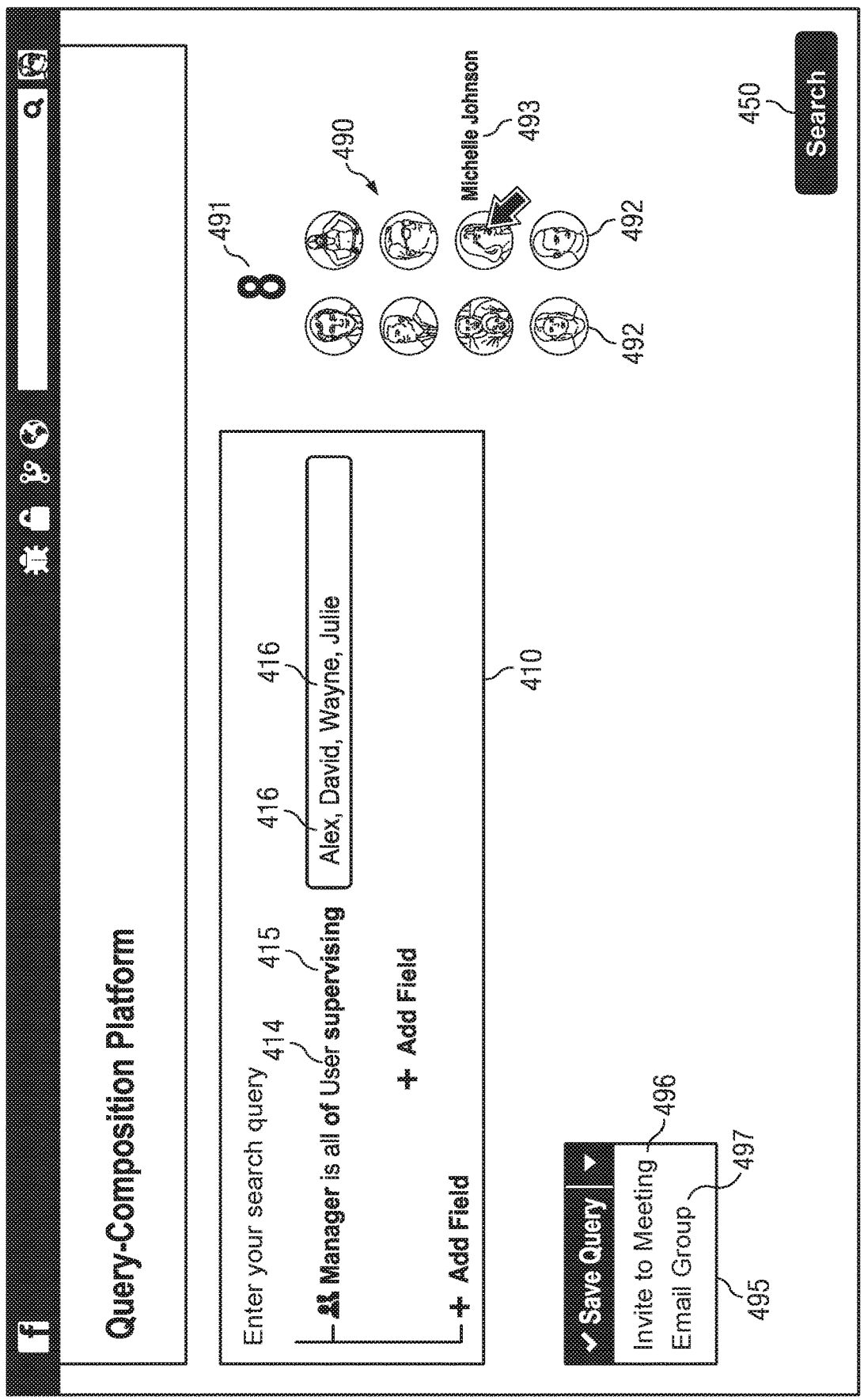

FIGS. 4A-4E illustrate composition of a query command through a user interface based on the query-composition platform. In particular embodiments, a user interface of the client system 130 of the first user may be created based on the query-composition platform to facilitate composition of query commands. This user interface may be called a query-composition interface. The query-composition interface may prompt the first user to input one or more query constraints and send the inputted query constraints to the query-composition platform. In particular embodiments, the query-composition interface may be embedded as part of a user interface of the social-networking system 160. As shown in FIG. 4A, the query-composition interface may comprise a search query block 410 that displays components of a query command that have been created by the first user and allows the first user to input further query constraints. The search query block 410 may comprise a representation of a set of source-objects "Manager" 411 that the first user previously inputted, a connector 412 that is included to make the form of the composed query command similar to a sentence written in natural language grammar, and display of a query constraint "all of" 413 that the first user previously inputted. Together, elements 411-413 indicate that the first user has inputted a query constraint corresponding to an operator configuration file, which may retrieve an intersection between a set of all manager objects and a to-be-entered set of objects. Following the display of the existing components of the query command, the search query block 410 may comprise an input field 430 that allows the first user to type in identifiers of one or more objects to be referenced in the query constraint. The input field 430 may incorporate a typeahead feature or a keyword completion feature to aid the first user. Alternatively, the first user may click on the "Dive" button 440 to add a constraint to the existing components of the query command. Alternatively, the first user may directly click on the "Add Field" button 420 to compose a query constraint on a different line, which may later be combined with the existing components of the query command. The first user may click on the "Dive" button 440 to add a query constraint. As shown in FIG. 4B, in response to the first user's action, the query-composition interface may display an additional "Add Field" button 420. The first user may click on the "Add Field" button 420 to trigger a dropdown menu 460 which provides a list of choices 461-463 and 466-469 for the first user. The first user may directly choose a query constraint from choices 461-463, which, in the current scenario, is not constructive. Alternatively, the first user may input a set of source-objects for the current query constraint by choosing from choices 466-469. Here, the first user may identify all users as the new set of source-objects by clicking on the "User" choice 469. Based on the first user's input of source-objects, the query-composition interface may provide a second dropdown menu 470 containing the choices 471-474, allowing the first user to choose a query constraint that will apply to the chosen source-objects (as shown in FIG. 4C). The dropdown menu 470 may also comprise a "Back" button 476 allowing the user to return to the previous dropdown menu. Here, the first user may click on the "supervising" button 474 to choose the "supervising" constraint. The "supervising" constraint, which identifies the supervisees of one or more named persons, may correspond to an edge configuration file "getSupervisee", which requires the input of a set of referenced objects. In response to the input, the query-composition interface may again provide an input field 430 for the first user to enter the referenced objects and may display dropdown menu 480 when the first user clicks on the input field 430 (as shown in FIG. 4D). The dropdown menu 480 may display a collection of objects 485 that might be referenced by the query constraint. The display of each object 485 may comprise attributes of the object such as an image, a name, an identifier, or a status update. The first user may reference one or more objects by clicking on their corresponding buttons. The current query constraint is complete after the first user finishes identifying the referenced objects. The query-composition interface may display the completed query constraint in the search query block 410 as components 414-416 (as shown on FIG. 4E). At this point, the first user may have completed composing the query command and click on the search button 450 to search the database system. The query-composition platform may retrieve one or more objects from one or more data stores 164 and send the objects to the client system 130 of the first user for display as part of the query-composition interface. A summary of search results 490 may be presented next to the search query block 410. It may comprise a count of search results 491 and a representation for each search result 492, which is a person in the current scenario. The first user may place the cursor onto a representation of a search result and trigger display of a name 493 associated with the search result. The query-composition interface may also comprise a save query block 495 that may provide multiple choices for the first user. The first user may send a calendar invite for a meeting to all persons returned by the search by clicking on a "Invite to Meeting" button 496 or email all persons returned by the search by clicking on a "Email Group" button 497.

Figure 5:
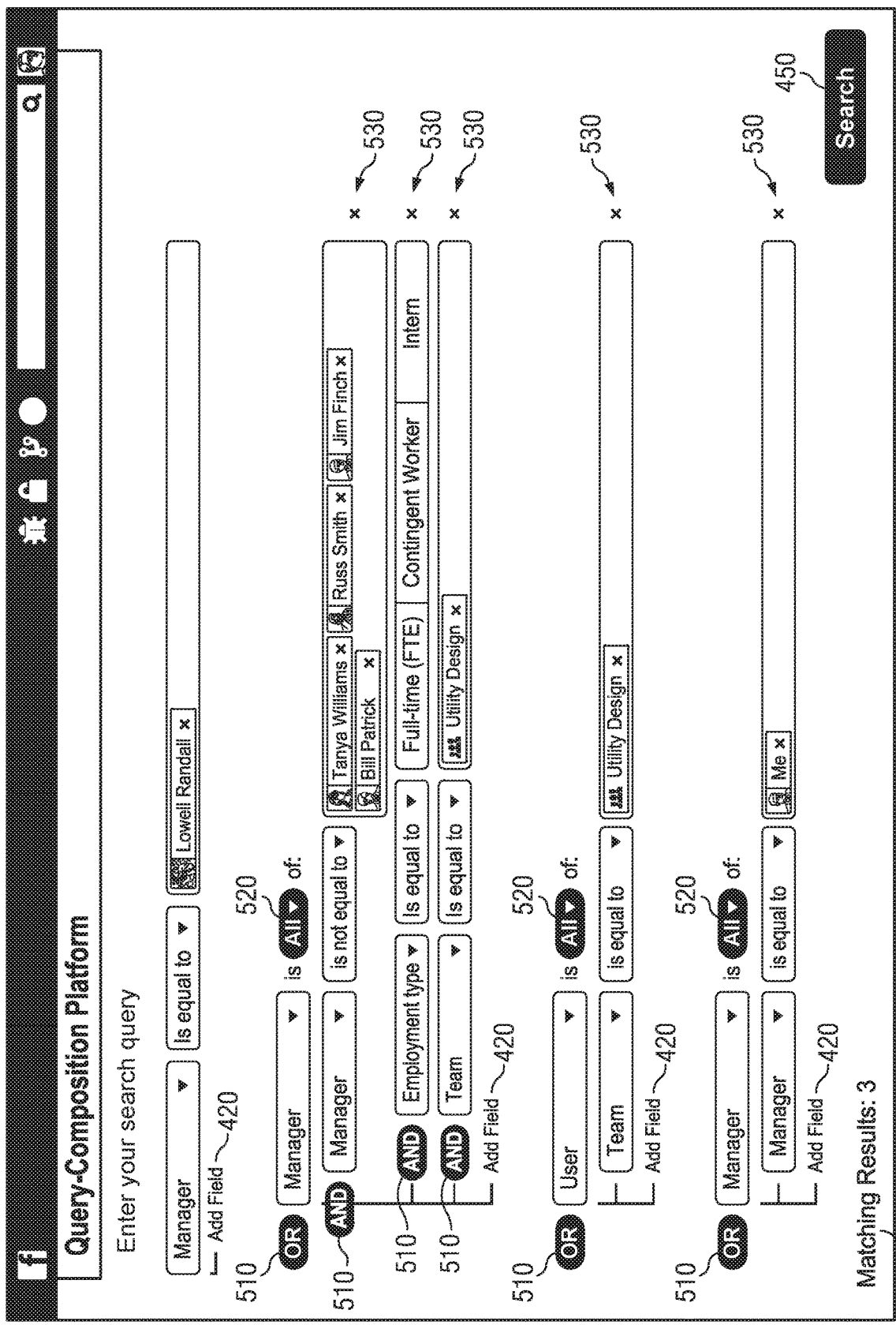
FIG. 5 illustrates an example display of a query command created with the query-composition platform.

FIG. 5 illustrates an example display of a query command created with the query-composition platform. As shown by FIG. 5, a query-composition interface based on the query-composition platform may contain a search query block 410. In particular embodiments, a collection of query-constraint elements 530 may be represented as a hierarchical tree diagram in the query-composition interface. The hierarchical structure of the tree diagram may be signaled by logical connectors 510 such as "OR" and "AND," which indicate a logical relationship between two or more peer elements and hierarchical connectors 520 such as "All," which indicate a relationship between a branch and its sub-branches or a node and one or more lower-level nodes on the tree diagram. In particular embodiments, the query command, as represented by the tree diagram, may be further grown by the user by clicking on the "Add Field" buttons 420. The query-composition interface may provide an estimate 540 of the number of results that will be returned by the first user's query command, which may guide the first user's decision on whether and how to modify the query command.

Figure 6:
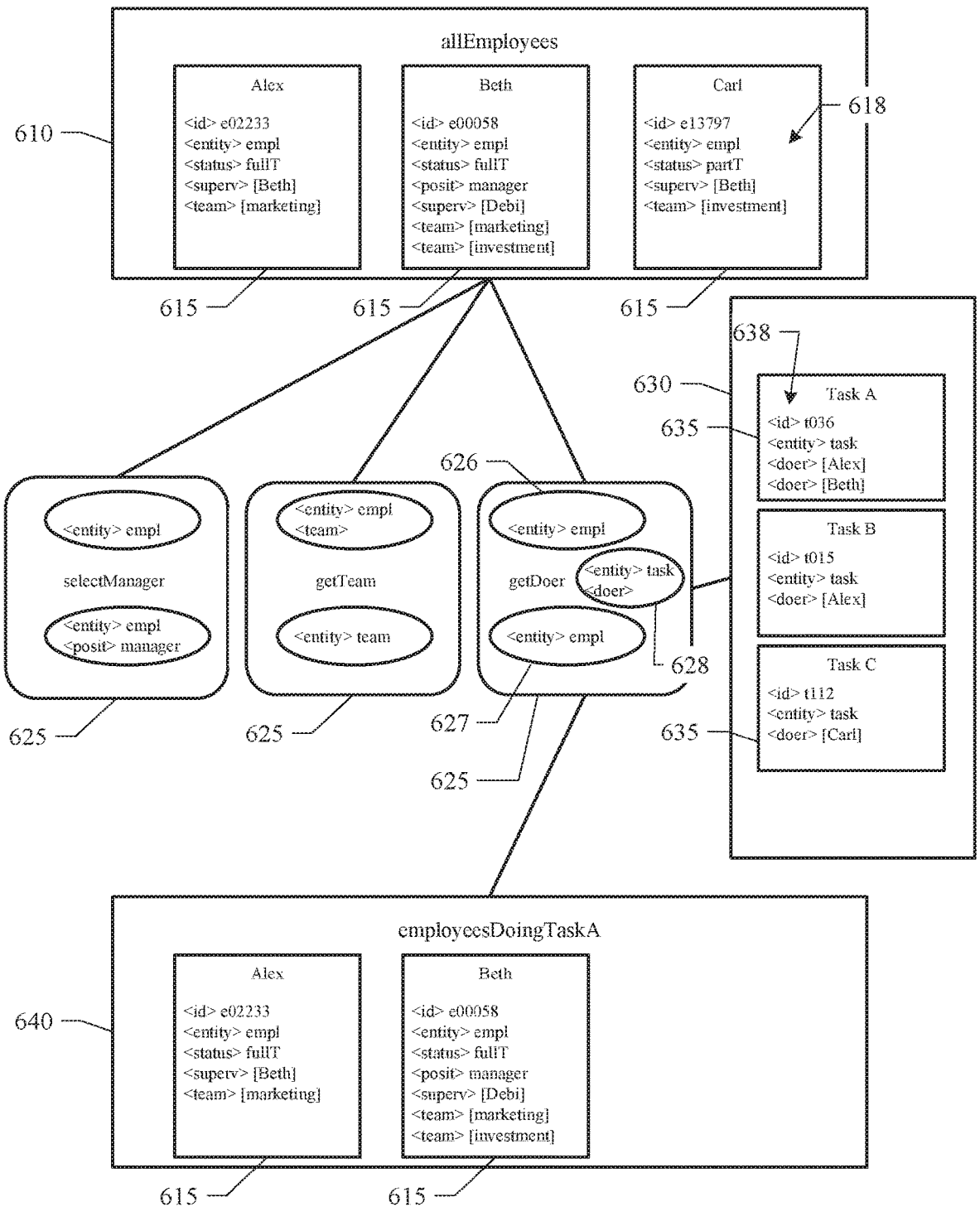
FIG. 6 illustrates an example background mechanism for generating query constraint choices.

FIG. 6 illustrates an example background mechanism for generating query constraint choices. In particular embodiments, a query-composition platform may be integrated with a human resources application, which comprise a database system of a plurality of data stores 164 containing human resources information. In a particular instance of use, the query-composition platform may receive, from the client system 130 of the first user, a selection of the object type "employee" as the starting point of composing a query command. In response to the user input, the query-composition platform may access a set of source-objects 610 in the plurality of data stores 164. Each of the source-objects 615 may have one or more attributes 618 that may also be stored in the data stores 164. The first user's selection of the object type "employee" may correspond to an object attribute <entity> empl in the current database system. The first user's selection may therefore cause the query-composition platform to only access objects 615 that have the attribute type <entity> and the attribute <entity> empl. In this example, the objects 615 correspond to individual employees. Based on the attributes of the source-objects 615, the query-composition platform may identify a collection of configuration files 620. The query-composition platform may also access information associated with each of the configuration files 625. Each configuration file 625 may specify one or more source-object attributes and attribute types 626 and one or more destination-object attributes and attribute types 627. Particular configuration files 625 may additionally require references to one or more objects in order to constitute a query constraint. Such a configuration file 625 may also specify one or more referenced object attributes and attribute types 628. In order to conduct a valid search of the database system when executed by a search engine, each configuration file's source-object attributes and attribute types must be fully matched by the attributes of at least one source-object 615. As an example and not by way of limitation, the configuration file "getTeam" specifies the source-object attribute <entity> empl and source-object attribute type <team>. This configuration filed may validly be identified by the query-composition platform because at least one object of the source-objects (e.g., Alex) has both the attribute <entity> empl and the attribute type <team>. The query-composition platform may send to the client system 130 of the first user for display one or more query constraints corresponding to the one or more identified configuration files 625 for the user to select from. In a particular instance of use, the first user may choose a query constraint corresponding to the configuration file "getDoer." In particular embodiments, the query composition platform may determine that this configuration file specifies one or more referenced object attributes and attribute types 628: attribute <entity> task and attribute type <Doer>. This may signal the query-configuration platform that user input of one or more referenced objects is necessary for the current query constraint. The query-composition platform may thereby identify a set of objects 630, stored in the database system, that may be referenced by the first user. In this example, each object that might be referenced 635 may have one or more attributes 638. For an objected to be validly referenced by the configuration file "getDoer," the object must have at least the attribute <entity> task and attribute type <Doer> as specified by the configuration file. The query-composition platform may then send, to the client system 130 of the first user for display, the potential referenced objects 635 for the first user to select from. In a particular instance of use, the first user may select the object "Task A" to reference in the query constraint. Based on the input the user, the query-composition platform may determine that the configuration file "getDoer" is an edge configuration file and may identify a set of destination-objects 640 based on the relational attributes <Doer> [Alex] and <Doer> [Beth] of the object "Task A." In this particular example, the employee objects "Alex" and "Beth" are identified as destination objects because of (1) that they are members of the set of source-objects, (2) that they are referenced by relational attributes of the referenced objects, and (3) that they both have the attribute <entity> empl that matches the only destination-object attribute specified by the configuration file "getDoer." Subsequently, the query-composition platform may send, to the client system 130 of the first user for display, one or more search results corresponding to one or more objects 615 included in the set of destination-objects 640. Alternatively, if the composition of the current query command has not been completed, the query-composition platform may repeat the above steps by accessing the set of destination objects 640 as a new set of source objects or a separately identified set of source objects.

Figure 7:
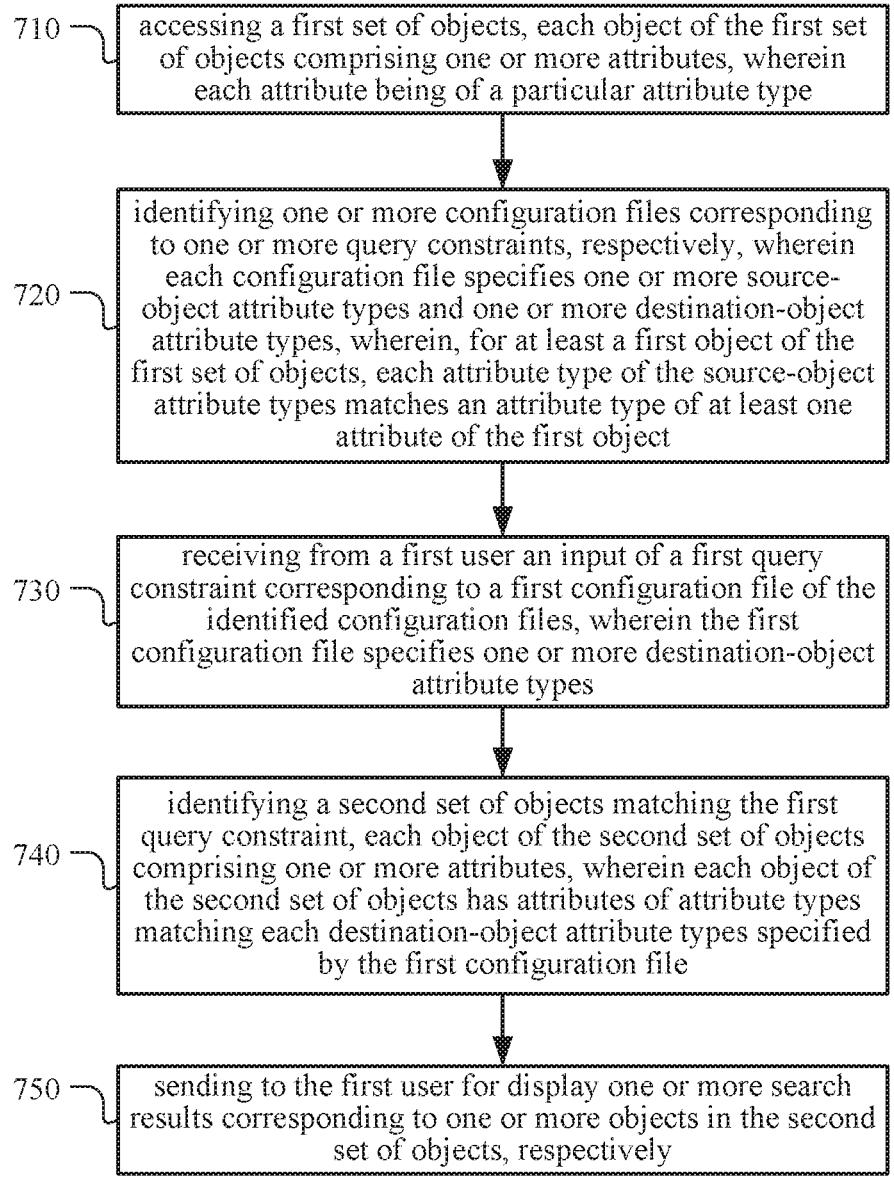
FIG. 7 illustrates an example method for composing a query command based on guided user inputs.

FIG. 7 illustrates an example method 700 for composing a query command based on guided user inputs. The method may begin at step 710, where the query-composition platform may access a first set of objects, each object of the first set of objects comprising one or more attributes, wherein each attribute being of a particular attribute type. At step 720, the query-composition platform may identify one or more configuration files corresponding to one or more query constraints, respectively, wherein each configuration file specifies one or more source-object attribute types and one or more destination-object attribute types, wherein, for at least a first object of the first set of objects, each attribute type of the source-object attribute types matches an attribute type of at least one attribute of the first object. At step 730, the query-composition platform may receive from a first user an input of a first query constraint corresponding to a first configuration file of the identified configuration files, wherein the first configuration file specifies one or more destination-object attribute types. At step 740, the query-composition platform may identify a second set of objects matching the first query constraint, each object of the second set of objects comprising one or more attributes, wherein each object of the second set of objects has attributes of attribute types matching each destination-object attribute types specified by the first configuration file. At step 750, the query-composition platform may send to the first user one or more search results corresponding to one or more objects in the second set of objects, respectively. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for composing a query command based on guided user inputs including the particular steps of the method of FIG. 7, this disclosure contemplates any suitable method for composing a query command based on guided user inputs including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 8:
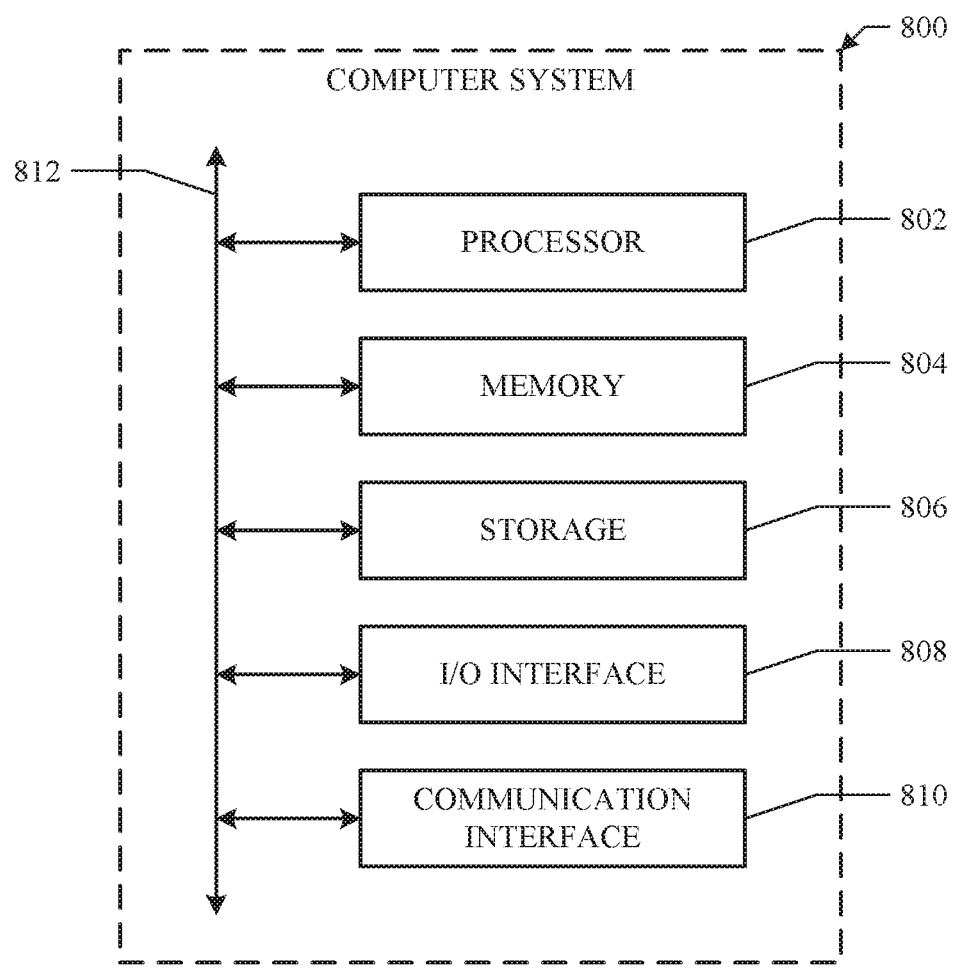
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
    receiving, by one or more of the computing devices, from a client system of a first user, via a query-composition platform, an input of a first query constraint of an unsubmitted partial query command, the first query constraint corresponding to a first attribute of a first attribute type;
    accessing, by one or more of the computing devices, a plurality of source objects from a database system, each object of the plurality of source objects comprising one or more attributes, each attribute being of a particular attribute type, wherein the plurality of source objects is identified based on the first query constraint;
    accessing, by one or more of the computing devices, a plurality of configuration files from the database system, each configuration file of the plurality of configuration files corresponding to one or more second query constraints, wherein each configuration file of the plurality of configuration files specifies (1) one or more source-object attribute types, (2) one or more destination-object attribute types, (3) one or more source-object attributes corresponding to one or more of the source-object attribute types, and (4) one or more destination-object attributes corresponding to one or more of the destination-object attribute types;
    identifying, by one or more of the computing devices, one or more valid configuration files from the plurality of configuration files, wherein each identified configuration file is determined to be valid based on (1) at least a first source object of the plurality of source objects having attributes and attribute types matching each source-object attribute and source-object attribute type specified by the configuration file, and (2) at least a first destination object of a plurality of destination objects having attributes and attribute types matching each destination-object attribute and destination-object attribute type specified by the configuration file;
    sending, to the client system of the first user for display, one or more suggested query constraints based on the identified one or more valid configuration files, wherein each of the suggested query constraints is one of the second query constraints;
    receiving, at one or more of the computing devices, from the client system of the first user, via the query-composition platform, an input of a second query constraint of the one or more second query constraints corresponding to one of the identified valid configuration files;
    identifying, by one or more of the computing devices, a plurality of destination objects, wherein each destination object of the plurality of destination objects has attributes and attribute types matching each destination-object attribute and destination-object attribute type specified by the valid configuration file corresponding to the input second query constraint; and
    sending, from one or more of the computing devices, to the client system of the first user for display, one or more search results corresponding to one or more destination objects in the identified plurality of destination objects, respectively.

2. The method of claim 1, wherein the first attribute corresponding to the input first query constraint is an object type of a plurality of object types.

3. The method of claim 1, wherein the plurality of source objects comprises one or more source objects identified by the first user.

4. The method of claim 1, wherein at least one object of the plurality of source objects or the plurality of destination objects comprises one or more relational attributes specifying one or more relationships between the object and one or more other objects.

5. The method of claim 1, further comprising accessing one or more data stores storing canonical representations for the plurality of configuration files based on the source-object attribute types, destination-object attribute types, source-object attributes, and destination-object attributes specified by the configuration files.

6. The method of claim 1,
    wherein each suggested query constraint is selectable by the first user.

7. The method of claim 1, further comprising:
    calculating, for each valid configuration file corresponding to one of the suggested query constraints, a size of a set of destination objects matching each destination-object attribute and destination-object attribute type specified by the valid configuration file; and
    sending, to the client system of the first user for display, for each suggested query constraint, an indicator corresponding to the calculated size of the set of destination objects for the corresponding valid configuration file.

8. The method of claim 1, further comprising ranking each of the suggested query constraints based on a search history associated with the first user.

9. The method of claim 1, wherein the input of the first query constraint comprises references to one or more source objects, wherein one or more relationships between each source object of the referenced source objects and one or more other objects are specified by one or more attributes of the referenced source object, the plurality of source objects, or the plurality of destination objects.

10. The method of claim 1, further comprising:
    accessing one or more data stores storing identifiers for the plurality of source objects and source object-attribute information comprising source-object attributes of the plurality of source objects.

11. The method of claim 1, wherein identifying the plurality of destination objects comprises:
   accessing one or more destination objects of the plurality of destination objects;
   determining whether each accessed destination object comprises a particular destination-object attribute specified by the identified valid configuration file corresponding to the input second query constraint; and
   selecting each accessed destination object determined to comprise the particular specified destination-object attribute to include in the identified plurality of destination objects.

12. The method of claim 1, wherein identifying the plurality of destination objects comprises:
   performing one or more set operations on the plurality of source objects and at least one other set of objects; and
   selecting one or more objects from an outcome of the performed set operations to include in the identified plurality of destination objects.

13. The method of claim 1, wherein identifying the plurality of destination objects comprises:
   accessing one or more destination objects;
   determining whether each accessed destination object has a particular relationship with one or more source objects of the plurality of source objects, wherein the relationship is specified in a relational attribute of an attribute type specified by the identified valid configuration file corresponding to the input second query constraint; and
   selecting each accessed destination object determined to have the specified relationship to include in the identified plurality of destination objects.

14. The method of claim 1, further comprising:
   accessing a social graph comprising a plurality of nodes and a plurality of edges connecting the nodes, wherein:
      each source object of the plurality of source objects and each destination object of the plurality of destination objects corresponds to a respective node of the plurality of nodes; and
      each attribute of each source object of the plurality of source objects and each destination object of the plurality of destination objects corresponds to a respective edge of the plurality of edges.

15. The method of claim 1, further comprising:
   storing the input second query constraint and an index comprising a plurality of entries, each entry corresponding to a respective destination object of the plurality of destination objects;
   detecting an updated plurality of source objects, wherein at least one object of the updated plurality of source objects or one object of the plurality of source objects is not included in either the updated plurality of source objects or the plurality of source objects;
   identifying, upon detecting the updated plurality of source objects, an updated plurality of destination objects matching the stored second query constraint; and
   updating the stored index based at least in part on the identified updated plurality of destination objects.

16. The method of claim 1, further comprising:
   sending, to the client system of the first user for display, a query-composition interface, wherein the query-composition interface comprises one or more query-constraint elements, each query-constraint element being operable to apply a respective query constraint, wherein the query-constraint elements are represented as a hierarchical tree diagram within the query-composition interface.

17. The method of claim 1, further comprising:
   generating a query command by combining the input second query constraint with one or more previously-entered query constraints;
   identifying a second plurality of destination objects from the database system based on the generated query command; and
   sending, to the client system of the first user for display, one or more search results corresponding to one or more objects in the second plurality of destination objects, respectively.

18. A method comprising, by one or more computing devices:
   sending, to a client system of a first user for display, one or more references to suggested source objects for the first user to choose from to be part of the input of a first query constraint;
   receiving, by one or more of the computing devices, from the client system of the first user, via a query-composition platform, an input of the first query constraint of an unsubmitted partial query command, the first query constraint corresponding to a first attribute of a first attribute type;
   accessing, by one or more of the computing devices, a plurality of source objects from a database system, each object of the plurality of source objects comprising one or more attributes, each attribute being of a particular attribute type;
   accessing, by one or more of the computing devices, a plurality of configuration files from the database system, each configuration file of the plurality of configuration files corresponding to one or more second query constraints, wherein each configuration file of the plurality of configuration files specifies (1) one or more source-object attribute types, (2) one or more destination-object attribute types, (3) one or more source-object attributes corresponding to one or more of the source-object attribute types, and (4) one or more destination-object attributes corresponding to one or more of the destination-object attribute types;
   identifying, by one or more of the computing devices, one or more valid configuration files from the plurality of configuration files corresponding to the one or more second query constraints, wherein each identified configuration file is determined to be valid based on (1) at least a first source object of the plurality of source objects having attributes and attribute types matching each source-object attribute and source-object attribute type specified by the configuration file, and (2) at least a first destination object of a plurality of destination objects having attributes and attribute types matching each destination-object attribute and destination-object attribute type specified by the configuration file;
   receiving, at one or more of the computing devices, from the client system of the first user, via the query-composition platform, an input of a second query constraint of the one or more second query constraints corresponding to one of the identified valid configuration files;
   identifying, by one or more of the computing devices, a plurality of destination objects, wherein each destination object of the plurality of destination objects has attributes and attribute types matching each destination-object attribute and destination-object attribute type specified by the valid configuration file corresponding to the input second query constraint; and sending, from one or more of the computing devices, to the client system of the first user for display, one or more search results corresponding to one or more destination objects in the identified plurality of destination objects, respectively;

wherein the input of the first query constraint comprises references to one or more source objects, wherein one or more relationships between each source object of the referenced source objects and one or more other objects are specified by one or more attributes of the referenced source object, the plurality of source objects, or the plurality of destination objects.

19. One or more computer-readable non-transitory storage media embodying software that is operable when executed to:

receive, by one or more computing devices, from a client system of a first user, via a query-composition platform, an input of a first query constraint of an unsubmitted partial query command, the first query constraint corresponding to a first attribute of a first attribute type;

access, by one or more of the computing devices, a plurality of source objects from a database system, each object of the plurality of source objects comprising one or more attributes, each attribute being of a particular attribute type, wherein the plurality of source objects is identified based on the first query constraint;

access, by one or more of the computing devices, a plurality of configuration files from the database system, each configuration file of the plurality of configuration files corresponding to one or more second query constraints, wherein each configuration file of the plurality of configuration files specifies (1) one or more source-object attribute types, (2) one or more destination-object attribute types, (3) one or more source-object attributes corresponding to one or more of the source-object attribute types, and (4) one or more destination-object attributes corresponding to one or more of the destination-object attribute types;

identify, by one or more of the computing devices, one or more valid configuration files from the plurality of configuration files, wherein each identified configuration file is determined to be valid based on (1) at least a first source object of the plurality of source objects having attributes and attribute types matching each source-object attribute and source-object attribute type specified by the configuration file, and (2) at least a first destination object of a plurality of destination objects having attributes and attribute types matching each destination-object attribute and destination-object attribute type specified by the configuration file;

send, to the client system of the first user for display, one or more suggested query constraints based on the identified one or more valid configuration files, wherein each of the suggested query constraints is one of the second query constraints;

receive, at one or more of the computing devices, from the client system of the first user, via the query-composition platform, an input of a second query constraint of the one or more second query constraints corresponding to one of the identified valid configuration files;

identify, by one or more of the computing devices, a plurality of destination objects, wherein each destination object of the plurality of destination objects has attributes and attribute types matching each destination-object attribute and destination-object attribute type specified by the valid configuration file corresponding to the input second query constraint; and send, from one or more of the computing devices, to the client system of the first user for display, one or more search results corresponding to one or more destination objects in the identified plurality of destination objects, respectively.

20. A system comprising: one or more processors; and a non-transitory memory coupled to the one or more processors comprising instructions executable by the one or more processors, the one or more processors operable when executing the instructions to:

receive, by one or more computing devices, from a client system of a first user, via a query-composition platform, an input of a first query constraint of an unsubmitted partial query command, the first query constraint corresponding to a first attribute of a first attribute type;

access, by one or more of the computing devices, a plurality of source objects from a database system, each object of the plurality of source objects comprising one or more attributes, each attribute being of a particular attribute type, wherein the plurality of source objects is identified based on the first query constraint;

access, by one or more of the computing devices, a plurality of configuration files from the database system, each configuration file of the plurality of configuration files corresponding to one or more second query constraints, wherein each configuration file of the plurality of configuration files specifies (1) one or more source-object attribute types, (2) one or more destination-object attribute types, (3) one or more source-object attributes corresponding to one or more of the source-object attribute types, and (4) one or more destination-object attributes corresponding to one or more of the destination-object attribute types;

identify, by one or more of the computing devices, one or more valid configuration files from the plurality of configuration files, wherein each identified configuration file is determined to be valid based on (1) at least a first source object of the plurality of source objects having attributes and attribute types matching each source-object attribute and source-object attribute type specified by the configuration file, and (2) at least a first destination object of a plurality of destination objects having attributes and attribute types matching each destination-object attribute and destination-object attribute type specified by the configuration file;

send, to the client system of the first user for display, one or more suggested query constraints based on the identified one or more valid configuration files, wherein each of the suggested query constraints is one of the second query constraints;

receive, at one or more of the computing devices, from the client system of the first user, via the query-composition platform, an input of a second query constraint of the one or more second query constraints corresponding to one of the identified valid configuration files;

identify, by one or more of the computing devices, a plurality of destination objects, wherein each destination object of the plurality of destination objects has attributes and attribute types matching each destination-object attribute and destination-object attribute type specified by the valid configuration file corresponding to the input second query constraint; and send, from one or more of the computing devices, to the client system of the first user for display, one or more search results corresponding to one or more destination objects in the identified plurality of destination objects, respectively.

* * * * *